United States Patent [19]

Pence

[11] Patent Number: 5,390,441
[45] Date of Patent: * Feb. 21, 1995

[54] SNAIL AND SLUG ERADICATION STAKE

[76] Inventor: Eric S. Pence, 204 Hygeia Ct., Leucadia, Calif. 92024

[*] Notice: The portion of the term of this patent subsequent to May 18, 2010 has been disclaimed.

[21] Appl. No.: 61,912

[22] Filed: May 14, 1993

Related U.S. Application Data

[63] Continuation-in-part of Ser. No. 878,214, May 4, 1992, Pat. No. 5,210,974.

[51] Int. Cl.⁶ .............................................. A01M 1/20
[52] U.S. Cl. ...................................................... 43/131
[58] Field of Search ................ 43/131, 124, 121, 120, 43/107; D22/119, 120; 47/33

[56] References Cited

U.S. PATENT DOCUMENTS

| | | | |
|---|---|---|---|
| 1,729,389 | 5/1928 | Hughett | 43/131 |
| 2,239,937 | 1/1939 | Smith | 43/131 |
| 2,547,314 | 8/1944 | Grant | 43/131 |
| 2,808,679 | 10/1957 | Collins | 43/131 |
| 2,837,861 | 6/1958 | Graham, Sr. | 43/131 |
| 2,913,204 | 11/1959 | Stewart | 248/71 |
| 3,130,425 | 4/1964 | Kelley | 470/34 |
| 3,427,743 | 2/1968 | Brunner et al. | 43/131 |
| 3,772,820 | 11/1973 | Bond | 43/131 |
| 3,978,607 | 9/1976 | Piere | 43/131 |
| 4,277,907 | 7/1981 | Ernest | 43/131 |
| 4,319,423 | 3/1982 | Judd | 43/121 |
| 4,485,582 | 12/1984 | Morris | 43/131 |
| 4,566,219 | 1/1986 | Firth | 43/107 |
| 4,821,452 | 4/1989 | Beckley | 43/131 |
| 5,210,974 | 5/1993 | Pence | 43/131 |
| 5,274,950 | 1/1994 | Roberts | 43/131 X |

FOREIGN PATENT DOCUMENTS

| | | | |
|---|---|---|---|
| 2817238 | 10/1979 | Germany | 43/131 |
| 434861 | 10/1967 | Switzerland . | |
| 632898 | 11/1982 | Switzerland | 43/131 |
| 15258 | 6/1910 | United Kingdom . | |
| 1448214 | 9/1976 | United Kingdom | 43/131 |

Primary Examiner—Kurt Rowan
Assistant Examiner—Jeanne M. Elpel
Attorney, Agent, or Firm—Knobbe, Martens, Olson & Bear

[57] ABSTRACT

A special stake-supported device preferably configured in one-piece of extruded-plastic material which, when mounted in the ground has an inverted J-shape. The portion remaining above ground, thereby forming a overhanging cantilevered-roof protective of an attractive molluscicide-substance, or bait where the cozy shaded overhang recess also acts to attract the snail out of the sun. Access to the bait for replacement purposes is provided by openings in the lateral edges of the portion remaining above ground. Liquid molluscicide bait can also be used to impregnate a fibrous material which is then mounted in upper portion. Further, flanges can also be positioned within the upper portion to provide a surface for mounting bait or bait impregnated fibrous material.

19 Claims, 2 Drawing Sheets

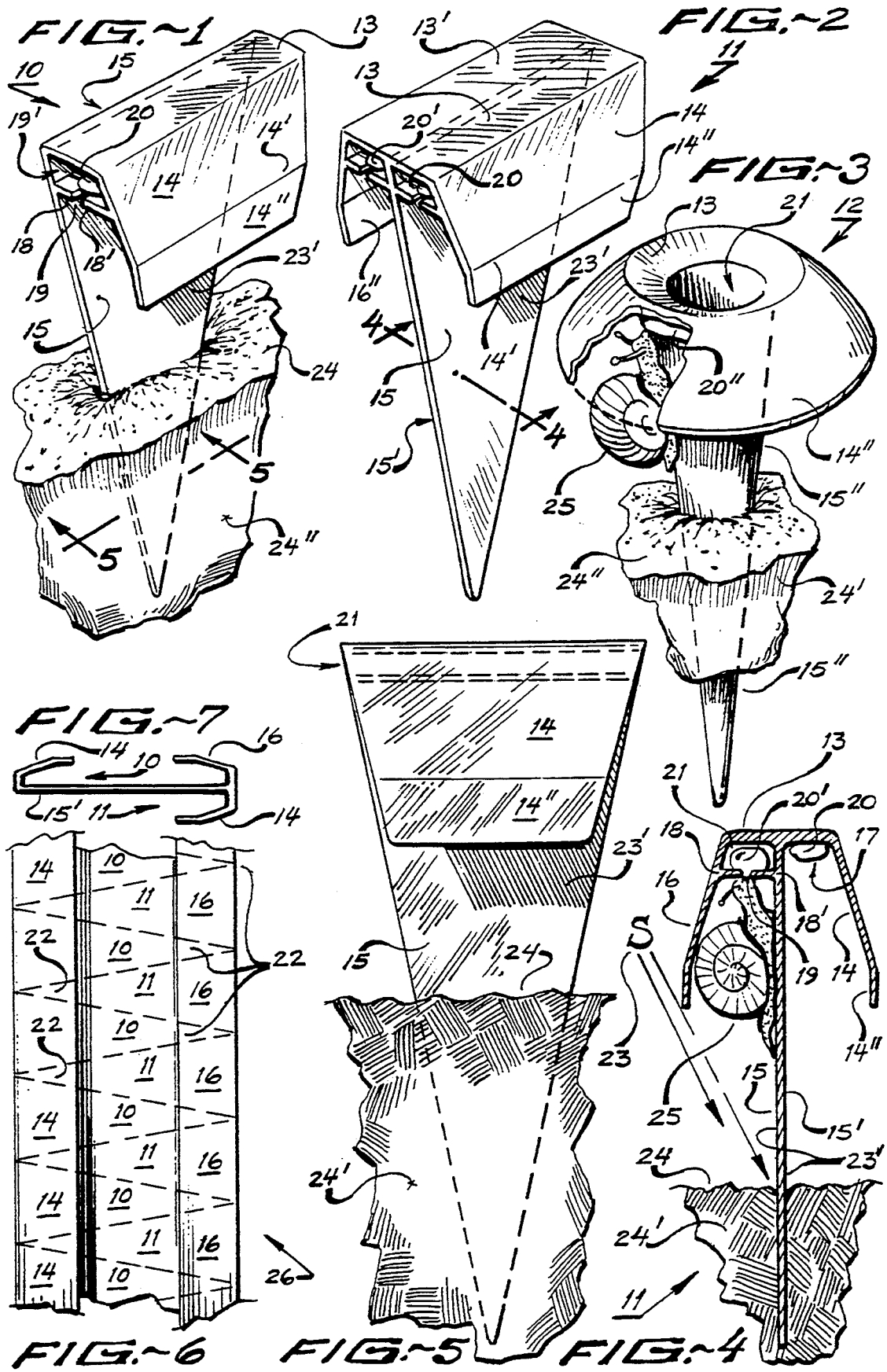

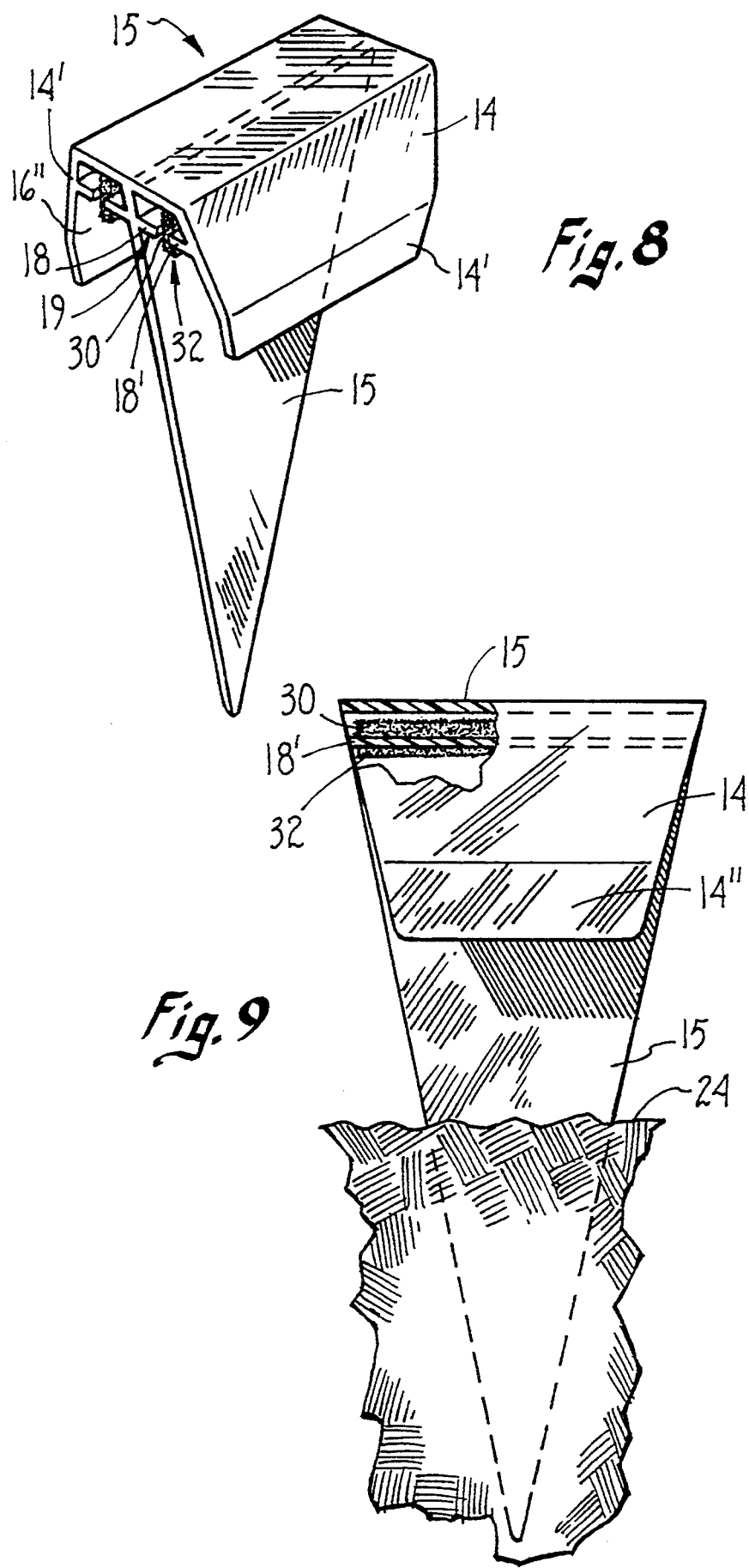

SNAIL AND SLUG ERADICATION STAKE

RELATED APPLICATIONS

The present application is a continuation in part of application U.S. Ser. No. 07/878,214, filed May 4, 1992, entitled "Snail/Slug Eradication Stake", now U.S. Pat. No. 5,210,974.

BACKGROUND OF THE INVENTION

1. Field of the Invention

This invention particularly relates to poisonous lures for eradication of the common phylum-mollusca (snail and slug) garden pests; and more specifically, the invention relates to those temporary devices which are manually positioned partially into the ground via a downward spike like member.

2. Description of the Prior Art

Heretofore, as revealed via prior art patent-search, it has generally been the practice of inventive thinking to produce poisonous-lures for snails defining a housing structure in which the snail actually enters, and within which the snail even dies, once having partaken of the fatal lure substance. A well known exception to such structural configuration has been in the form of a stake-like poisonous-lure for ant-insects, which was set forth in U.S. Pat. No. 2,547,314 (filed Aug. 1, 1944). This shows a vertical light-weight corrugated-metal stake portion, to one side-surface of which is tab-crimped a small circular container filled with a gelatinous substance deadly to ants. The object of this construction was found in the particular undulations which provided tiny pocket areas attractive to the ants, arranged about the perimeter of the poison container, in addition to a central entry-hold of about 5/16"-diameter. These devices are still a popular selling ant-lure, but are not known to be effective against snails in that they do not afford an attractive cool crevice in which to dwell.

The oldest known device known to employ a spike for retention into the ground is that of U.S. Pat. No. 1,729,389 (filed April 1928), comprising a poison container-cup having an underside spike, and a lift-off cap thereupon; allowing filling of the poison into the cup. Still other inventions more specific to snail control are known, for example old U.S. Pat. No. 1,872,780 (filed November 1920) shows a dish-like base over which is positioned a special cover portion having several entryway arches. Another example of a spiked type of snail lure is found in U.S. Pat. No. 2,239,937 (filed January 1939). Which is a three-piece apparatus called a "bait protector," wherein a long rod-like spike with a loop on it's uppermost end, is equipped with an annular hood and is inserted down through the center of a bait-dish and down into the ground. This apparatus would thus be too bulky to use in many desired applications, where a dish and overhanging hood could not fit, such as in a flower-pot.

Later, U.S. Pat. No. 2,837,861 (filed July 1957) introduced a spiked insecticide-container having an integral annular tray and a dome-like top having many tiny holes for entry of ants. Again the annular shape would tend to be rather bulky. And U.S. Pat. No. 3,427,743 (filed January 1969) introduced another spike type insect bait-dispenser with an annularly-compartmented tray, but which uppermost hood member fits down to the ground, while an uppermost installation T-handle is unscrewable from the central spike so as to prevent the installed device from being readily accessed by children and pets. Again though, this configuration is too bulky for use in flower-pots for example.

Then U.S. Pat. No. 3,772,820 (filed November 1973) featured central ground-spike with an annular dome-like hood having a scalloped-rim portion positioned upon the ground, thereby enabling snails and slugs to enter the hood overlaying confines. A vertically adjustable portion of the hood may be raised to allow more water to enter from some lawn-sprinkler, thereby metering water therein to activate the poison-bait. Again, the device is too bulky in diameter. U.S. Pat. No. 3,978,607 (filed September 1976) again featured a bait-dish located beneath a perimeter-scalloped hood member, with a central spike passing down unitingly through the aggregate members and into the ground;—including a convenient grasping member, enabling the device to be easily withdrawn from the ground for relocation. But again, the device is too bulky for flower-pot use.

Next, U.S. Pat. No. 4,485,582 (filed December 1984) shows an insect lethal-feeding station, rather mushroom like in formation; including a tubular ground-spike member for thrusting into the earth. The spike is formed integrally with an upper tray-like bait holding portion, which is topped with a transparent-cap having three perimeter entry apertures. Thus, while the device could be installed in a flower-pot, it's structural provisions appear to accommodate use for bugs and ants only.

Further, U.S. Pat. No. 4,821,452 (filed December 1987) shows a one-piece dome shaped snail-lure, the perimeter of which features three snail entry arches, the sides of which extend downward in a V-shaped manner so that the dome may be easily stabilized an inch or two into the ground by these three prongs. Once having entered the shady confines of the dome, the snail is enticed to climb the inside wall surface between the arches, so as to access the lure of a poison-bait gel-substance applied to the ceiling of the dome chamber. While, the poison is protected from sprinkling water, and not accessible to child or pet while the device is implanted, it is again too bulky to be installed into a flower-pot. Thus, one can see from this most relevant known invention-art, that there is still room for improvement in devising a ground snails, yet readily installed into a flower-pot.

Finally, British Patent #1,448,214 (filed Dec. 14, 1972) discloses a garden pest eradicator device essentially comprised of a rectangulary shaped, closed canopy mounted upon a vertical stake. However, the narrow vertical stake disclosed in the British '214 patent is not particularly suitable or attractive as a climbing surface for snails and slugs. Additionally, the configuration of the '214 patent is particularly bulky which would effectively prevent its use in enclosed spaces such as flower pots and the like. Further, the eradicator device shown in the British '214 patent also does not permit easy installation or replacement of bait. Specifically, the user of the British '214 patent must use a spatula-like tool to apply bait to the underside of the closed canopy.

The foregoing discussion of prior art garden pest control devices, reveals that there is a need for a compact snail and slug eradication device which can be readily installed into a flower bed or flower pot. There is also a need in the prior art for such a snail or slug eradication device which can be inexpensively made using known techniques such as plastic extrusion. Further, there is also a need in the prior art for a snail and slug eradication device which allows easy access for replacement of the poison bait. Such access permits the user to maximize the effectiveness of the eradication device by periodically supplying it with fresh bait.

Additionally, one of the more commonly available baits is purchased in a liquid form and, when applied to a surface, it then dries to either a semi-viscous or solid form prior to being consumed by the snails and slugs. Typically, when liquid bait is applied, the device cannot be used until the bait dries as otherwise the bait would simply run off of the device. Further, if liquid bait is applied to a smooth surface, it may fail to adhere to the surface after it has dried. Hence, a need also exists in the prior art for a snail and slug eradication device which provides both ready access to the bait chamber as well as providing a surface to which liquid bait will readily adhere.

SUMMARY OF THE INVENTION

The aforementioned needs are satisfied by the present invention of a ground inserted stake device for the eradication of garden snail and slug pests. The ground inserted stake device includes a climbing body portion with a point for insertion in the ground, and an upper body portion extending outwards from the climbing body portion in at least one direction. An awning extending substantially toward the ground is attached to the edge of the upper body portion located away from the climbing body portion. The awning also has a pair of lateral edges and an underside that collectively define a J-shaped void. Bait is then positioned within the J-shaped void in a bait receiving area accessible to the snails and slugs. Further, there can be one or more flanges attached to the underside of the awning as part of the bait receiving area where bait can also be placed.

In another aspect of the present invention, the ground inserted stake device also includes a removable member, such as a flexible piece of fibrous material, which is configured to fit within the bait receiving area. Liquid bait can be used to impregnate, or otherwise be bonded to, the removable member positioned within the bait receiving area permitting the ground inserted stake device of the present invention to be used immediately after application of the bait. Further, the material of the removable member can be selected so that once the liquid bait dries, the bait will be bonded to the removable member, minimizing the problem of the bait drying and falling off.

These and other objects and features of the present invention will become more fully apparent from the following description and appended claims taken in conjunction with the accompanying drawings.

BRIEF DESCRIPTION OF THE DRAWINGS

FIG. 1, is a pictorial perspective view looking downward at the overhanging awning and left frontal aspect thereof, including phantomed portions otherwise hidden from view;

FIG. 2, is a similar viewing aspect, exhibiting a generic variant embodiment of opposed configuration;

FIG. 3, is a downward looking pictorial view, exhibiting a generic variant embodiment of circular configuration, including a cutaway portion of the umbrella;

FIG. 4, is a longitudinal end/elevation-view according to visual projection reference-arrow 4:4 of FIG. 2, wherein is included a phantom-outline depicting a usual snail retreat position thereto;

FIG. 5, is a frontal/elevation-view according to visual projection reference-arrow 5:5 of FIG. 1;

FIG. 6, is an alternate frontal-view thereof, showing how the device is preferably obtained from a continuous section;

FIG. 7, is a longitudinal end/elevation-view rotated 90-degrees therefrom;

FIG. 8, is a perspective view of the snail and slug eradication stake of the present invention with a piece of fibrous bait retaining material inserted between two flanges of the eradication stake; and FIG. 9, is a front elevational view of the snail and slug eradication stake of the present invention with a portion removed to reveal the interior thereof.

DETAILED DESCRIPTION OF THE PREFERRED EMBODIMENTS

Initial reference is given by way of FIG. 1, showing a first embodiment of the invention 10, preferably having a two-edged planar substantially spade shaped vertical stake portion 15 (having back side surface 15') which pointed terminus is easily pushed manually down into surface 24 of earthen soil 24''. This stanchion portion is preferably formed continuously up into a roof like surface region 13 which continues outward and back downward into an upper-awning like surface portion 14 (having provisional crease like ridge 14' and lower-awning portion 14''); thus forming an inverted-J configuration. Note also, how a hollow retention tunnel 19' is preferably created via opposed shelf like flanges 18/18', so as to retain a poison substance 20 preferably having substantially the same consistency as a gel, while leaving a gap forming an access feeding slot 19 there between.

This basic construction is made in the siamesed (twin-opposed) embodiment of FIG. 2, wherein the roof portion 13' is extended in opposite directions so as to somewhat more effectively attract snails from opposite directions to climb surfaces 15 or 15' to reach the poisonous bit 20/20'; hence this configuration is rather T-shaped. Reference to FIG. 4 end-view shows the aggregate portions are all extruded along the same linear direction, and further demonstrates how the snail 25 is able to climb the stake surface 15' access feeding slot 19, and partake of the bait 20'. Here, at the right, we also see a simplified variant of the invention, whereby no bait retention-flanges are provided, so the poisonous gel 20 is merely applied to the linear ceiling-crevice 17 of the overhanging roof/awning aggregation 13/14. Notice also, that the snail 25 is attracted up under the inverted-U shaped overhang by virtue of the shady region 23' (also shown in FIGS. 1, 2, 3, 5) cast by the sun's rays 23.

This extruded embodiment of the invention is further revealed in FIGS. 6 and 7, wherein FIG. 6 is a frontal or plan-view showing how the lengthy extruded member 26 is preferably cut into individual preferably symmetrical (FIG. 5) pie-shaped segments 10 and 11 which represent the finished parts 10 and 11 exhibited in FIGS. 1 and 2, respectively. How two different parts are derived from a single extrusion-die is best revealed in FIG. 7, wherein the end-view shows a single awning version on the left, and a double-awning version on the right of the single extruded member; which are post-extrudedly cut apart as stated. Very little scrap 22 is left by this technique.

Another preferably one-piece generic-variant is exhibited in FIG. 3, which is a rather mushroom like embodiment 12 owing to its being essentially a circular version of FIG. 1 embodiment 10 (if one were able to wrap the right and left ends of stake 10 around to meet each other contiguously). This injection-molded opaque-plastic version thus includes a conical stake climbing surface 15" (with central conical molding-void entity), and a rather umbrella-like roof 13" and awning portion 14". Here, a partial awning cutaway portion shows a snail which has climbed up under the awning to partake of the bait substance 20" having substantially the same consistency as a gel contained within the circular ceiling-crevice under region 13".

It is preferred to make all versions of the invention of opaque-plastic, since any clarity would reduce the attractive shady effect of the awning, which snails naturally migrate to. The extruded feeding-tunnel 19' lends itself to containment of a gel-like bait substance, or if preferred a cartridge-like bait stick may be readily inserted, automatically ejecting any stale unit in the process.

FIGS. 8 and 9 illustrates an additional preferred embodiment of the present invention incorporating a member 30 inserted in the feeding slot 19' of the snail and slug eradication stake of the present invention. In the embodiment shown in FIG. 8, the member 30 is flexible and securely mounted in the feeding tunnel 19' by being wedged in the feeding slot 19.

The member 30 is preferably impregnated with a liquid molluscicide bait such as DEADLINE ® manufactured by Pace National Corporation of Kirkland, Wash. The liquid molluscicide bait is preferably applied to the underside 32 of the member 30 mounted in the feeding tunnel 19' in the aforementioned fashion.

The member 30 can be comprised of any flexible material having a surface which can be impregnated with, or otherwise bond to, a liquid molluscicide bait in sufficient quantities that slugs and snails are attracted to the bait and can then consume a lethal dose of the bait from the surface 32 of the member 30. In this preferred embodiment, the member 30 is comprised of a fibrous material, such as 100% rayon felt manufactured by Victory Pacific Felt of Carlsbad, Calif.

As is shown more clearly in FIG. 9, the member 30 is preferably mounted with approximately a third of the member positioned underneath the flanges 18, 18' with the surface 32 underneath the flanges 18, 18' having been impregnated with the liquid molluscicide bait (not shown). The slugs and snails preferably are then attracted to the bait and climb the surface 15 in the previously described manner, consume a lethal dose of the bait from the member 30 and then die. Note, the bait impregnated fibrous member 30 can also be glued or otherwise fixedly attached to the linear ceiling crevice 17 of the simplified variant of the present invention shown in FIG. 4 above.

The foregoing descriptions of the preferred embodiments of the present invention reveals a snail and slug eradication stake suitably compact for use in flower pots and flower beds. Use of this stake minimizes the need to spread poison materials in flower beds, gardens and flower pots in locations accessible to household pets and children while still providing access to the poison for snails and slugs. The stake also provides easy access to the bait by the user, who can replace the bait by simply removing old bait and inserting the new bait at the openings of the bait retention tunnel 19.

Further, the foregoing description also discloses a snail and slug eradication stake incorporating a removable, replaceable flexible fibrous material suitable for applying liquid molluscicide bait. Use of such a flexible, fibrous material permits liquid bait to be used without having to wait for the bait to dry. Additionally, the flexible fibrous material provides a surface that the liquid molluscicide bait will adhere to, even after the liquid bait has dried.

Therefore, it is understood that the utility of the foregoing adaptations of this invention are not necessarily dependent upon any prevailing invention patent; and while the present invention has been well described hereinbefore by way of preferred embodiments, it is to be realized that various changes, alterations, rearrangements, and obvious modifications may be resorted to by those skilled in the art to which it relates, without substantially departing from the implied spirit and scope of the instant invention. Therefore, the invention has been disclosed herein by way of example, and not as imposed limitation. Accordingly, the embodiments of the invention in which an exclusive property or proprietary privilege is claimed, are defined as follows.

What is claimed is:

1. A ground inserted stake device for the eradication of garden snails and slug pests comprising:

a single climbing body portion having a substantially planar configuration and a terminus wherein said terminus is configured for insertion into the ground;

an upper body portion connected to the climbing body portion substantially opposite the pointed terminus;

an awning attached to said upper body portion and extending outwardly from the upper body portion and downwardly toward the ground, said awning having a pair of lateral edges and an underside that collectively define a J-shaped void; and a bait-receiving area within said J-shaped void that is accessible from either of said pair of lateral edges.

2. The ground inserted stake device for the eradication of garden pests of claim 1, wherein said climbing body has a triangular planer configuration.

3. The ground inserted stake device for the eradication of garden pests of claim 1, wherein said climbing body and said awning are integrally formed by extrusion molding.

4. The ground inserted stake device for the eradication of garden pests of claim 1, wherein said bait receiving area includes at least one flange attached to said underside and extending between said pair of lateral edges, said flange providing a surface for bait to be positioned.

5. The ground inserted stake device for the eradication of garden pests of claim 1, wherein bait comprised of a gel is positioned within said bait receiving area.

6. The ground inserted stake device for the eradication of garden pests of claim 1, wherein bait comprised of a solid substance is positioned within said bait receiving area.

7. The ground inserted stake device for the eradication of garden pests of claim 1, further comprising a removable member positioned within said bait receiving area, wherein bait is attached to said removable member.

8. The ground inserted stake device for the eradication of garden pests of claim 7, wherein said removable member material is comprised of an absorbent flexible fibrous strip, and said absorbent flexible fibrous strip is impregnated with a liquid molluscicide bait.

9. A ground inserted stake device for the eradication of garden snails and slug pests comprising:
- a climbing body portion having a substantially planar configuration and a pointed terminus for insertion into the ground;
- an upper body portion connected to the climbing body portion substantially opposite the pointed terminus;
- an awning attached to said upper body portion and extending outwardly from the upper body portion and downwardly toward the ground said awning having a pair of lateral edges and an underside that collectively define a J-shaped void;
- a bait-receiving area within said J-shaped void that is accessible from either of said pair of lateral edges;
- a removable member detachably mounted in said bait-receiving area; and
- a molluscicide bait attached to said removable member.

10. The ground inserted stake device for the eradication of garden pests of claim 9, further comprising at least one flange within said bait receiving area.

11. The ground inserted stake device for the eradication of garden pests of claim 10, wherein said removable member is positioned at least in part on said at least one flange.

12. The ground inserted stake device for the eradication of garden pests of claim 9, wherein said removable member is comprised of an absorbent fibrous strip, which is impregnated with a liquid molluscicide bait.

13. A ground inserted stake device for eradication of garden snails and slug pests comprising:
- means for mounting said ground inserted stake device into the ground;
- means for retaining liquid bait attractive and fatal to said garden snails and slug pests in a position accessible to said garden snails and slug pests;
- a planar climbing surface configured so that said garden snails and slug pests have access to said bait from said planar climbing surface;
- means for providing shade for said bait to further attract said garden snails and slug pests to said bait and
- means for providing lateral replacement of said bait.

14. The ground inserted stake device for the eradication of garden snail and slug pests of claim 13, wherein said means for mounting said ground inserted stake device into the ground is comprised of a pointed terminus.

15. The ground inserted stake device for the eradication of garden snails and slug pests of claim 14, wherein said means for retaining liquid bait in a position accessible to said garden snails and slug pests is comprised of a flexible member positioned within a bait receiving area adjacent to a top of said climbing surface, wherein said pointed terminus is connected to said climbing surface substantially opposite to said bait receiving area.

16. The ground inserted stake device for the eradication of garden snail and slug pests of claim 15, wherein said means for providing shade for said bait is comprised of an upper body portion, connected to said climbing surface, with an awning attached to said upper body portion and extending outwardly from the upper body portion and downwardly toward the ground, said awning having a pair of lateral edges and an underside that collectively define a J-shape void comprising said bait receiving area;

17. The ground inserted stake device for the eradication of garden snail and slug pests of claim 16, wherein said means for providing lateral replacement of said bait is comprised of a pair of openings defined by said pair of lateral edges of said J-shaped void.

18. The ground inserted stake device for the eradication of garden snails and slug pests of claim 17, further comprising a flange attached to said underside of said upper body portion.

19. The ground inserted stake device for the eradication of garden snails and slug pests of claim 18, wherein said flexible member is impregnated with said liquid bait and said flexible member is positioned at least in part on said flange.

* * * * *